United States Patent [19]
Fisher et al.

[11] Patent Number: 5,490,693
[45] Date of Patent: Feb. 13, 1996

[54] TUBE COUPLING LOCKING DEVICE

[75] Inventors: Ronald K. Fisher, Ravenna; Gerald A. Babuder, Mentor; David L. Doty, Twinsburg, all of Ohio

[73] Assignee: Cajon Company, Macedonia, Ohio

[21] Appl. No.: 314,338

[22] Filed: Sep. 28, 1994

[51] Int. Cl.⁶ .............................. F16L 35/00; F16L 15/08
[52] U.S. Cl. .................. 285/92; 285/420; 285/81
[58] Field of Search ................... 70/229, 232, 230, 70/231; 411/119, 120, 121; 285/420, 80, 81, 92, 89; 403/11, 19

[56] References Cited

U.S. PATENT DOCUMENTS

| | | | |
|---|---|---|---|
| 619,795 | 2/1899 | Schreiner | 70/232 |
| 716,204 | 12/1902 | DeWaldo | 285/80 |
| 1,365,477 | 1/1921 | Gabriel et al. | 281/80 |
| 1,433,382 | 10/1922 | Kiper | 285/92 |
| 1,858,992 | 5/1932 | Hansen | 285/87 |
| 1,914,736 | 6/1933 | Coutu | 285/92 |
| 3,249,370 | 5/1966 | Brogden | 285/114 |
| 5,139,289 | 8/1992 | Koss | 285/80 |
| 5,222,768 | 6/1993 | Hofer et al. | 285/39 |
| 5,312,139 | 5/1994 | Marks et al. | 285/92 |
| 5,348,349 | 9/1994 | Sloane | 285/92 |
| 5,350,201 | 9/1994 | Bynum | 285/92 |
| 5,362,111 | 11/1994 | Harbin | 285/330 |

FOREIGN PATENT DOCUMENTS

| | | | |
|---|---|---|---|
| 441683 | 8/1991 | European Pat. Off. | 285/92 |
| 624386 | 6/1949 | United Kingdom | 285/92 |
| 859598 | 1/1961 | United Kingdom | 285/81 |

*Primary Examiner*—Eric K. Nicholson
*Attorney, Agent, or Firm*—Fay, Sharpe, Beall, Fagan, Minnich & McKee

[57] ABSTRACT

A tube coupling locking assembly for preventing undesired loosening of a make-up coupling includes a cooperating pair of rigid lock members that encircle about a coupling nut with one of the lock members having an end connected to a second cooperating coupling nut or the body of an associated fluid device. The cooperating lock members are arranged to prevent relative rotation between the encircled coupling nut and the cooperating coupling nut or associated fluid device.

17 Claims, 3 Drawing Sheets

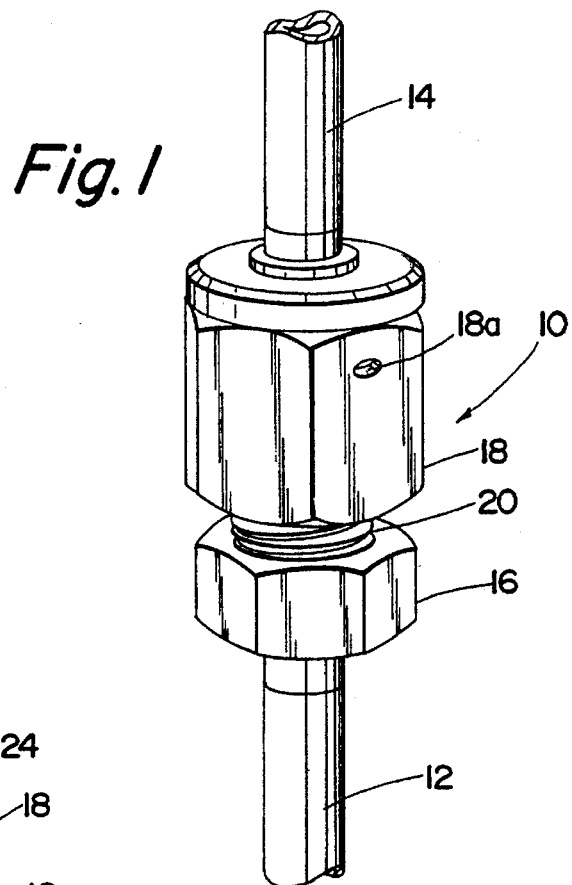
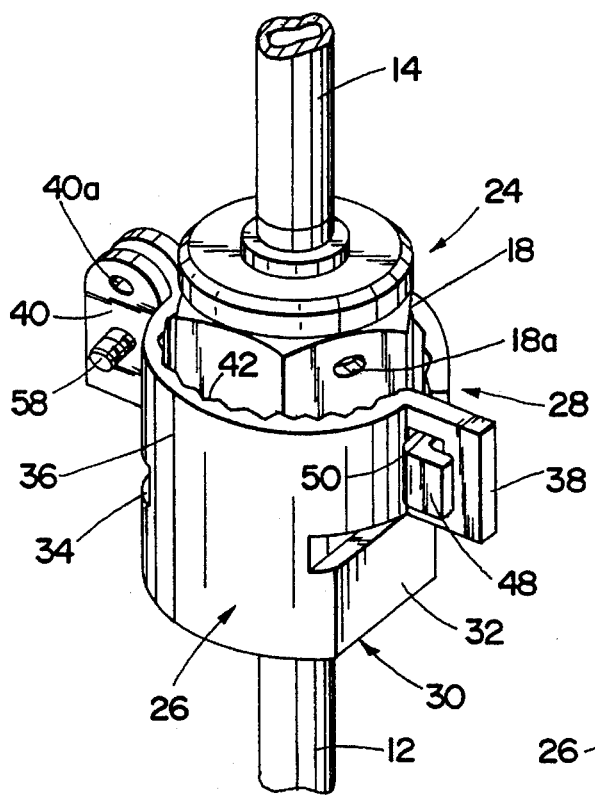
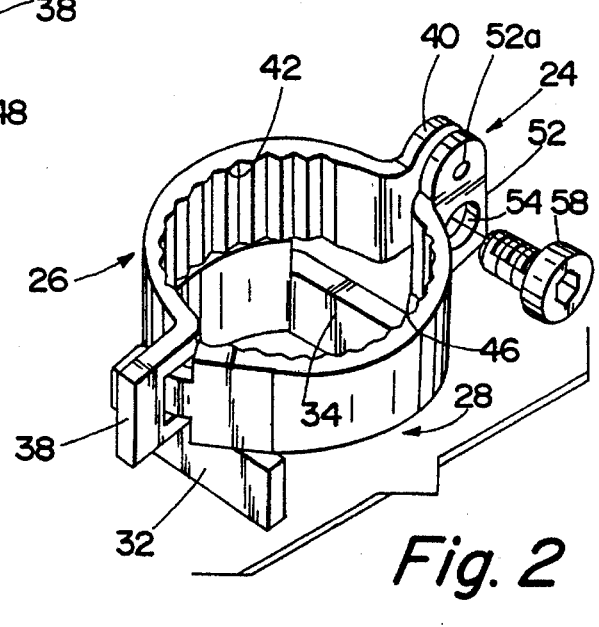

TUBE COUPLING LOCKING DEVICE

BACKGROUND OF THE INVENTION

The subject invention is directed toward the art of tube couplings and, more particularly, to a device intended to prevent undesired loosening of a threadedly connected tube coupling.

The device of the invention is especially suited for use with union type couplings and will be described with reference thereto; however, the invention can be used with other types of couplings including couplings constituted as an integral part of a flow device such as a valve.

One commonly used type of tube coupling comprises male and female body components joined by cooperating threads that permit connection and disconnection by relative rotation about the tubing centerline (see, for example, U.S. Pat. Nos. 5,135,269 and 5,066,051). The conditions to which the connected coupling is subjected can sometimes, over a period of time, cause loosening and resultant leakage. Although this rarely happens with a properly made-up, fully torqued fitting, in certain environments and when handling certain fluids, any possibility of leakage cannot be tolerated.

Many different types of lock devices have been proposed in the prior art for the prevention of random, undesired loosening of such couplings. However, these prior art devices have generally suffered from one or more disadvantages or defects. For example, certain prior art lock designs require installation prior to coupling makeup, and retrofitting is not possible without system disassembly. With certain other designs, it has sometimes been necessary to locate the coupling components in a particular aligned relationship before the devices will function properly.

SUMMARY OF THE INVENTION

Accordingly, a need exists for an improved locking assembly which can be used on tube couplings and fluid devices of the type having integral tube coupling ends. In particular, and in accordance with one aspect of the invention, there is provided a tube coupling assembly that comprises first and second coupling body sections having cylindrical end portions joined by axially interconnected male and female threaded portions with each body section having wrench flats formed in parallel pairs on opposite sides thereof. A releasable locking clamp is provided to prevent undesired unthreading of the connected first and second body sections. The locking clamp includes a first clamp member having a first end with spaced parallel, rigid arms engaged with the wrench flats on opposite sides of the first body section. A second end of the first clamp member has a rigid, concave configuration engaged about the second coupling body section. A second clamp member with a clamping surface of concave configuration is engaged about the second coupling body section in opposed relationship to the second end of the first clamp member and is joined thereto by releasable connecting means to clamp to the second body section. The relationship between the locking clamp and the coupling body sections is such that the male and female threaded end portions cannot be disconnected or cannot loosen when subject to vibration, inadvertent mechanical engagement, and environmental changes such as temperature or the like.

Preferably, each of the concave clamping surfaces of the first and second clamp members are provided with closely spaced, axially extending grooves to increase the gripping ability relative to the second body section.

The design allows the locking clamp to be formed as a relatively inexpensive but rigid metal stamping. In addition, as can be seen, the design is such that it can be readily applied and removed from a selected coupling assembly without disassembling the fluid system.

In accordance with a further and more limited aspect of the invention, it is desirable to have the first and second clamp members hingedly joined so as to facilitate installation and removal from clamping relationship with the tube coupling body sections. By the use of the hinge connection, a single fastener can be used to draw the clamp members into engaged, clamped and locked position.

In addition to its use on a tube coupling, the invention can be applied to other types of fluid system devices such as valves or the like wherein an integral coupling member is provided. In such cases, the first clamping member can be rigidly but releasably connected directly to the body of the fluid system device while the coupling nut engaging portions are releasably engaged about the associated coupling nut.

As can be seen from the foregoing, a primary object of the invention is the provision of a locking assembly which can be used readily on tube couplings and flow system devices such as valves and the like.

Yet another object is the provision of a device of the general type described which can be readily installed and quickly removed from tube couplings.

A further object is the provision of a locking clamp assembly that is of simple design and readily adaptable to a variety of different sizes and styles of coupling devices.

A still further object is the provision of a lock device of the type described that can be loosened and slid axially to allow servicing of the coupling without complete removal of the lock device.

BRIEF DESCRIPTION OF THE DRAWINGS

The above and other objects and advantages will become apparent from the following description when read in conjunction with the accompanying drawings wherein:

FIG. 1 is a perspective view of a tube coupling assembly of the type to which the subject invention is applicable;

FIG. 2 is a perspective view of the preferred form of releasable locking clamp formed in accordance with the subject invention;

FIG. 3 is a perspective view showing the tube coupling assembly of FIG. 1 with the releasable locking clamp of FIG. 2 applied thereto;

DETAILED DESCRIPTION OF THE PREFERRED AND ALTERNATE EMBODIMENT

Figure 4:
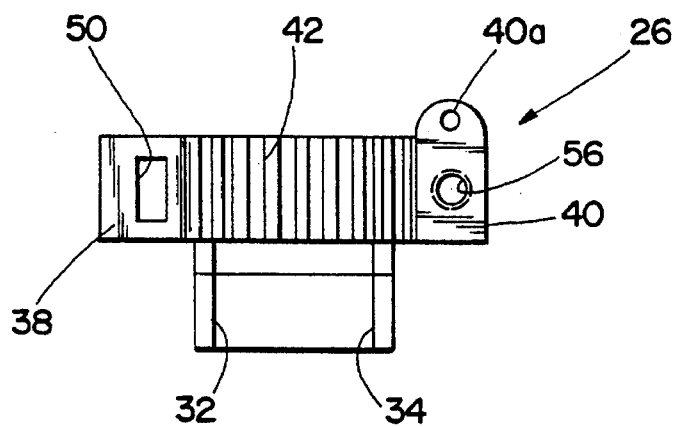
FIG. 4 is an elevational view of one of the components of the locking clamp assembly of FIG. 2.

Referring now to the drawings wherein the showings are for the purposes of illustrating the preferred embodiment of the invention only and not for purposes of limiting same, FIGS. 1 through 3 best indicate the overall arrangement and construction of the preferred form of the invention. Referring in particular to FIG. 1, the device of the subject invention is particularly suited for use in preventing undesired loosening and inadvertent disconnection of a tube coupling assembly of the general type shown in FIG. 1. As shown, the coupling assembly 10 of FIG. 1 is intended to releasably join in flow relationship a pair of aligned tube sections 12 and 14. The coupling assembly broadly includes a pair of cooperating first and second threadedly engaged coupling body sections 16 and 18. The body section 16 is generally shown as a male body section having a male threaded end portion 20 that is received in a correspondingly threaded opening in the main female body section 18. The coupling nuts or body sections 16, 18 act to move cooperating internal seal surfaces into sealingly engaged position during tightening of the two body sections. It should be noted that, as is customary, the external surfaces of the somewhat cylindrical body sections are provided with oppositely disposed sets of wrench flats to facilitate the tightening and release of the coupling sections. In the subject embodiment, the wrench flat surfaces have a hex layout.

In order to prevent the tube coupling assembly of FIG. 1 from being loosened through vibrations or other environmental changes, the subject invention proposes a locking clamp assembly 24 which is best illustrated in FIGS. 2 and 3. As shown therein, the locking clamp assembly 24 includes a first clamp member 26 and a cooperating second clamp member 2S that is arranged for releasable connection thereto. The first clamp member 26 includes a first lower (as shown in FIGS. 2 and 3) end portion 30 that carries an interconnected pair of laterally spaced, generally flat and rigid arms 32 and 34 which are sized and spaced so as to slidably engage and closely grip the opposed wrench flat surfaces of the first coupling body section 16. This relationship can best be seen in FIG. 3 wherein the arms 32 and 34 are in engaged position on the wrench flats of body section 16.

Figure 5:
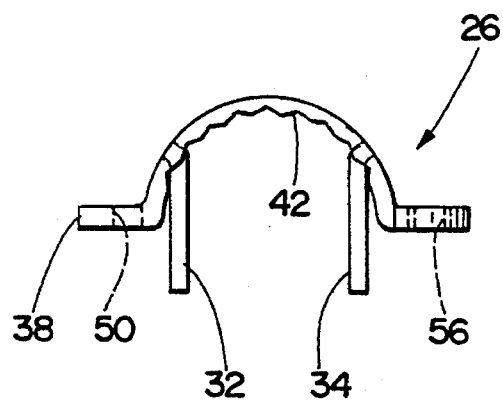
FIG. 5 is a top plan view of the components shown in FIG. 4.

The first clamp member 26 further includes a second end that is integral with the first end and has a rigid concave portion 36 arranged to closely engage about the second coupling body section 18. Laterally extending flange end portions 38 and 40 directly join to the concave section 36 as illustrated in FIGS. 2 and 3. Preferably, the interior clamping surface of the concave section 36 is provided with a multiplicity of closely spaced grooves contoured for engaging the corners between intersecting wrench flats on the second body section 18. The grooved portions 42 are formed by intersecting planar surfaces arranged to intersect at the same angle as the wrench flats on the body section 18. The arrangement of these grooved portions 42 can best be seen in FIG. 5.

Figure 6:
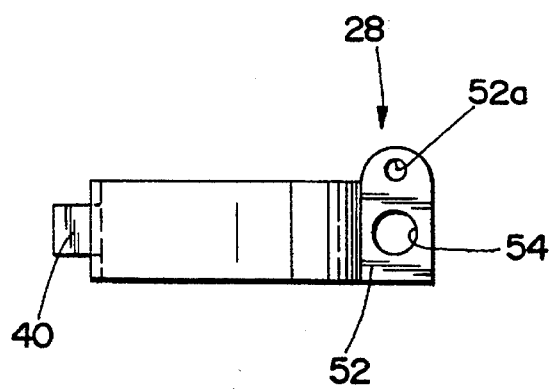
FIG. 6 is a side elevational view of the second main component of the locking clamp of FIG. 2.
Figure 7:
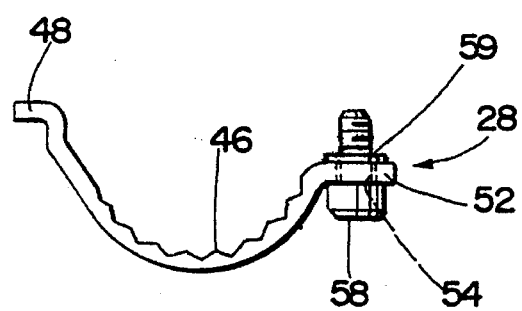
FIG. 7 is a top plan view of the FIG. 6 component.

The first clamp member 26 is clamped and held in engaged position on the coupling assembly 10 by the cooperating clamp member 28. Member 28 is shown in FIGS. 2 and 3 but is more fully detailed in FIGS. 6 and 7. As illustrated, the clamp member 28 has a concave clamping surface 46 generally corresponding in shape to the previously-mentioned concave clamping surface of the first clamp member 26. The opposite ends of the clamp member are arranged for releasable connection with the end flanges 38, 40 of the first clamp member 26. A first end of member 28 terminates in a tab portion 48 that is bent in an angular configuration and adapted to be received through an opening 50 formed in the end flange 38 of member 26. This provides a hinge-like connection between the clamping members 26, 28. At its opposite end, the second clamp member 28 is provided with a flange end 52 having a fastener receiving opening 54 extending therethrough. Similarly, the flange end 40 of clamp member 26 is also provided with a fastener receiving opening 56 that is arranged so that when the components are in their assembled position shown in FIGS. 2 and 3, the openings 54 and are in alignment for suitable receipt of a fastener therethrough. The fastener could, of course, be a fixed, permanent fastener such as a rivet or, alternatively, a removable fastener such as a bolt or screw. In the subject embodiment, the opening 56 is internally threaded and a socket head machine screw 58 is arranged to extend through opening 54 into threaded engagement with opening 56 to allow an adjustable and releasable clamping of the clamp members 26, 28 in engagement on the coupling assembly Preferably, a plastic retaining washer 59 holds screw 58 in place on member 28 (see FIG. 7) to facilitate final assembly to member 26 during makeup. It is also desirable to silver plate screw 58 to provide reduced assembly torque and extend thread life.

The interior clamping surface 46 of the second clamp member 28 is also preferably provided with longitudinally extending grooves in the nature of grooves 42 of the first component 26. Thus, a firm gripping is provided with respect to the coupling 10.

The tabs 52 and 40 are further provided with small openings 52a and 40a for receipt of safety or seal wires if desired.

If the coupling is provided with leak test ports such as ports 18a shown in FIGS. 1 and 3, it is highly desirable that the axial length of the second end 36 and the clamp member 28 be dimensioned to eliminate possible blocking of the test ports. It should also be noted that the subject design is preferably dimensioned such that when the retaining screw 58 is loosened, the clamp assembly can be slid downwardly off the coupling (as viewed in FIG. 3) without full disassembly of, or removal of, clamp member 28. Thus, access to the coupling for servicing, seal replacement, or the like is facilitated.

It is also highly desirable to dimension the clamp members relative to the coupling such that when made up on the coupling, the opposed faces of flanges 40 and 52 come into contact to provide an indication of full makeup. The dimension should, of course, be such that loosening through inadvertent contact with the components, vibration, and temperature changes is not possible. At the same time, however, the torque required to tighten the fastener to the fully engaged position should not be unduly high.

Figure 8:
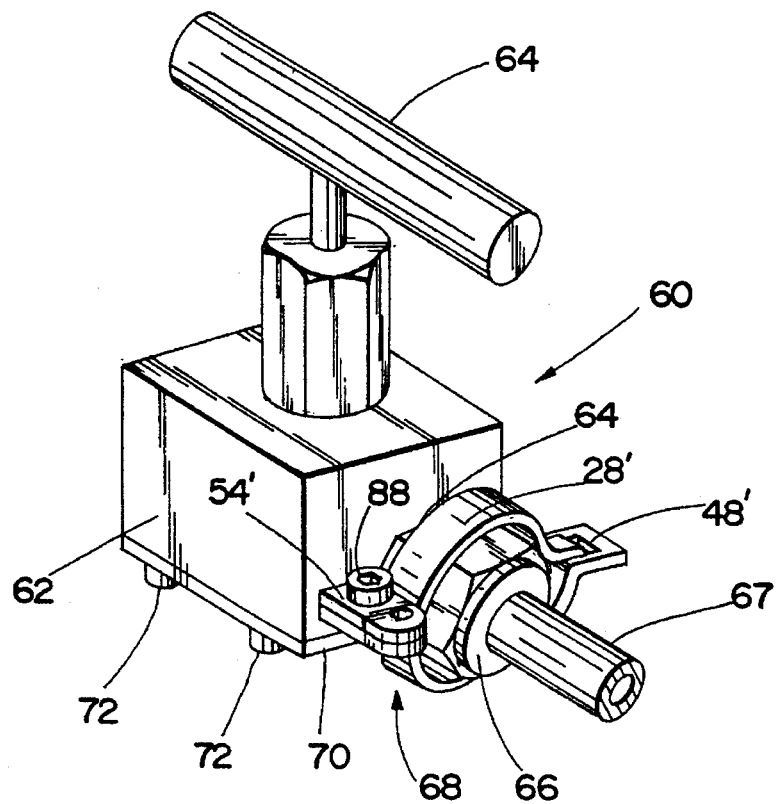
FIG. 8 is a perspective view of a valve having an integrally arranged coupling nut on an inlet with a second form of locking clamp assembly shown in position thereon.
Figures 9, 10:
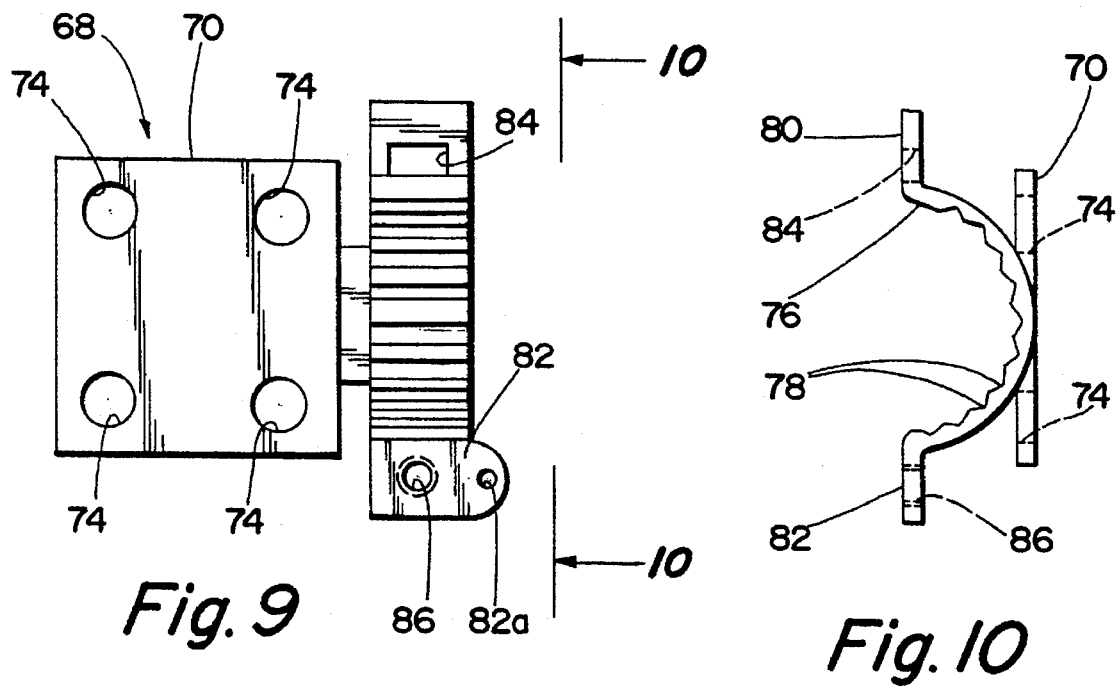
FIG. 9 is a top plan view of the main locking clamp element of the FIG. 8 embodiment; and, FIG. 10 is a view taken on lines 10—10 of FIG. 9.

A further embodiment of the invention is illustrated in FIGS. 8 through 10. This embodiment is particularly suited for use on flow system devices such as valves that include a coupling component incorporating a coupling nut directly connected to the inlet or outlet flow passages from the associated fluid device. In the FIG. 8 showing, a valve 60 has a generally rectangular body 62 including an internal valve chamber. A valve element (not shown) is moved between open and closed positions by a manually operated handle 64. The valve includes an inlet or outlet passage 64 which has an integral male threaded end arranged to allow connection to a corresponding female coupling nut member 66 on a supply or discharge fluid passage 67 to which the valve is to be connected.

In the FIGS. 8–10 embodiment, the locking clamp assembly includes a first clamp member 68 that has a first end 70 in the form of a rectangular plate portion that can be connected to the underside of the valve body 60 by a plurality of machine screws or the like 72. The screws 72 are arranged to extend through openings 74 formed in plate 70 into threaded openings in the valve body. The second end of the first clamp member 68 is rigidly and integrally connected to the first end and includes a concave shaped portion 76 that is sized and positioned so as to closely engage about the underside of the female coupling nut 66 when the end 70 is attached in position on the valve body 62. The portion 76 is basically the same in shape and configuration as the second end portion 42 of the previously-discussed clamping member 26. That is, the concave shaped portion 76 is provided with the longitudinally extending, closely spaced grooves 78 in the manner of previously-discussed grooves 42. Additionally, terminal end flange portions 80 and 82 extend laterally outwardly with portion 80 including an opening 84. The opposite end flange 82 includes a threaded central opening 86 and a safety wire opening 82a as best illustrated in FIG. 9. This arrangement allows a second clamp member identical to previously-discussed clamp member 28 to be mounted in clamping and opposed position to the concave portion 76. In the FIG. 8 showing, the second clamp member is identified as 28' and is, as mentioned, identical in structure and design to the previously-mentioned clamp member 28 shown in FIGS. 6 and 7. The end tab 48' extends through the opening 84 to provide a hinge-like connection between members 68 and 28'. A threaded fastener in the form of a socket head machine screw 88 extends through opening 54' and engages in the threaded opening 86 on flange portion 82. Thus, the coupling nut 66 can be locked in its connected position to prevent inadvertent disconnection or loosening.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A tube coupling assembly comprising first and second coupling body sections having cylindrical end portions joined by axially interconnected male and female threads and each body section having wrench flats formed in parallel pairs on opposite sides of the respective body section, a releasable locking clamp to prevent undesired unthreading of the connected first and second body sections, the locking clamp including a first clamp member having a first end with spaced parallel rigid arms engaged with the wrench flats on opposite sides of the first body section and a second end of the first clamp having a rigid concave configuration engaged about the second coupling body section, and a second clamp member with a clamping surface of concave configuration engaged about the second coupling body section in opposed relationship to the second end of the first clamp member and joined thereto by connecting means to clamp the locking clamp to the second body section.

2. The tube coupling assembly as set forth in claim 1 wherein the first and second clamp members are formed as steel stampings.

3. The tube coupling assembly as set forth in claim 1 wherein the second clamp member has its clamping surface formed with a series of closely spaced grooves.

4. The tube coupling assembly as set forth in claim 1 wherein the first and second ends of the first clamp member are integral and the second clamp member is hinged to the first clamp member.

5. The tube coupling assembly as set forth in claim 1 wherein the second clamp member has pivotal engagement with the first clamp member at one lateral side of the coupling and the releasable connecting means comprises a threaded fastener.

6. The tube coupling assembly as defined in claim 5 wherein one of the first and second clamp members includes a tab portion that extends through an opening formed in the other of the first and second clamp members to provide the said pivotal engagement.

7. The tube coupling assembly as defined in claim 6 wherein the first clamp member has a clamping surface engaged with second coupling body section.

8. The tube coupling assembly as defined in claim 7 wherein the clamping surface of the first clamp member and the clamping surface of the second clamp member are provided with axially extending grooves.

9. A tube coupling assembly comprising:

a tube coupling joining a pair of axially aligned tube and including first and second generally cylindrical coupling body sections axially aligned with the tubes and releasably connected by cooperating male and female threaded portions;

a releasable lock means for preventing undesired unthreading of the first and second coupling body sections, the lock means including a first clamp member extending along the first and second coupling body sections with a first end adjacent the first coupling body section and a second end adjacent the second coupling body section, engagement means carried on the first end of the first clamp member for preventing relative motion between the first coupling body section and the first clamp member in directions which could cause unthreading of the cooperating male and female threaded portions, a second clamp member joined by connecting means to the second end of the first clamp member to cooperate therewith to encircle the second coupling body section, said connecting means including threaded connecting means for causing the first and second clamp members to be driven toward one another to grip the second coupling body section therebetween.

10. The tube coupling assembly as defined in claim 9 wherein the first clamp member has a concave configuration at its second end and the second clamp member has a corresponding concave configuration.

11. The tube coupling assembly as defined in claim 9 wherein the connecting means includes a threaded connector.

12. The tube coupling assembly as defined in claim 11 wherein the connecting means further includes a hinge to permit relative pivoting movement between the first clamp member and the second clamp member.

13. The tube coupling assembly as defined in claim 9 wherein there are at least a pair of parallel wrench flats formed on diametrically opposite sides of the generally cylindrical first coupling body section and the engagement means includes spaced parallel arms that engage the said wrench flats.

14. A fluid system device comprising:

a main body having a flow passage extending thereinto;

a fluid supply tube connected to the said flew passage in the main body by a fluid coupling including a generally cylindrical internally threaded female coupling nut;

a locking clamp assembly for preventing undesired movement of the female coupling nut relative to the main body, the locking clamp assembly comprising a first rigid clamp member having a first end joined to the main body and a second end adjacent the female coupling nut, and a second rigid clamp member cooperating with the first clamp member for encircling the female nut member, said second clamp member releasably connected to the first clamp member by adjustable connecting means for clamping the first and second clamp members to the female nut member, the second clamp member having first and second end portions with the first end portion of the second clamp member connected to the first clamp member by a hinge means and the second end portion of the second clamp member connected to the first clamp member by a threaded connector.

15. The fluid system device as set forth in claim 14 wherein the first end of the first clamp member is joined to the main body by a releasable connection means.

16. The fluid system device as set forth in claim 14 wherein the second clamp member has a clamp surface of concave configuration.

17. The fluid system device as set forth in claim 16 wherein the clamp surface has closely spaced grooves formed therein.

* * * * *